United States Patent [19]

Picone

[11] Patent Number: 4,785,672

[45] Date of Patent: Nov. 22, 1988

[54] PRINTED CIRCUIT CAPACITANCE ELECTRODES

[75] Inventor: Thomas L. Picone, Holland, Pa.

[73] Assignee: Fischer & Porter Co., Warminster, Pa.

[21] Appl. No.: 59,412

[22] Filed: Jun. 8, 1987

Related U.S. Application Data

[63] Continuation-in-part of Ser. No. 329,302, Feb. 14, 1986, Pat. No. 4,658,652.

[51] Int. Cl.$^4$ ............................................. G01F 1/58
[52] U.S. Cl. ............................... 73/861.12; 73/861.14
[58] Field of Search ......................... 73/861.12, 861.14

[56] References Cited

U.S. PATENT DOCUMENTS 4,497,212 2/1985 Schmoock ..................... 73/861.12
4,539,853 9/1985 Appel et al. .................... 73/861.12

FOREIGN PATENT DOCUMENTS 2634702 2/1978 Fed. Rep. of Germany ... 73/861.12

Primary Examiner—Charles A. Ruehl
Attorney, Agent, or Firm—Michael Ebert

[57] ABSTRACT

A magnetic flowmeter in which a fluid to be metered is conducted through a ceramic spool coaxially supported within a cylinder casing to define an inner chamber. Mounted within the chamber at opposing positions on a magnet axis perpendicular to the longitudinal flow axis of the spool are a pair of electromagnets to establish an electromagnetic field in the spool whose lines of flux are intercepted by the fluid to induce a voltage therein. Interposed between the electromagnets and the outer surface of the spool and conforming to and secured to this surface are a pair of flexible printed circuit boards which are so printed as to define capacitance metering electrodes at diametrically-opposed positions on the spool on an electrode axis at right angles to the magnet axis and at right angles to the longitudinal flow axis, whereby the voltage induced in the fluid is picked up by these electrodes to produce a signal which depends on the flow rate of the fluid.

11 Claims, 3 Drawing Sheets

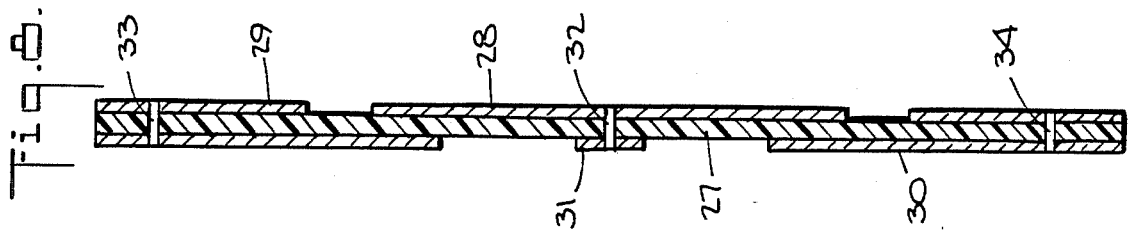
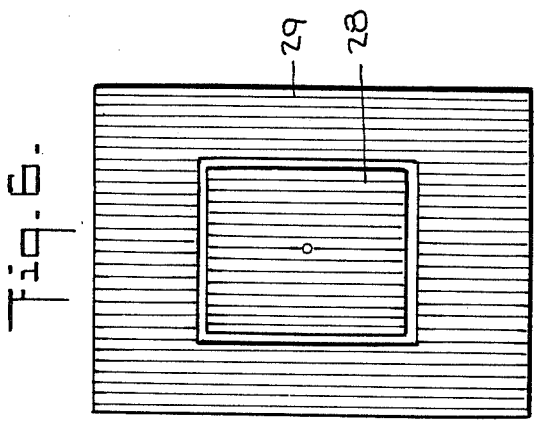
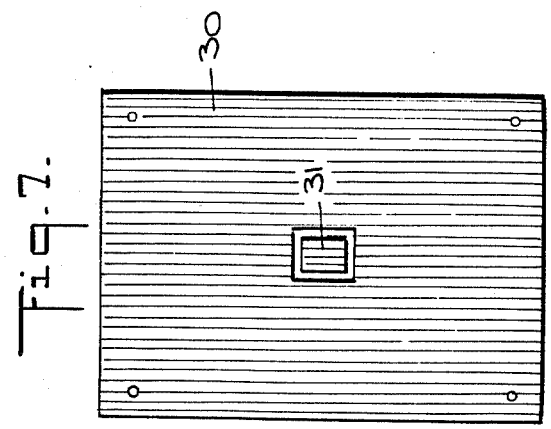
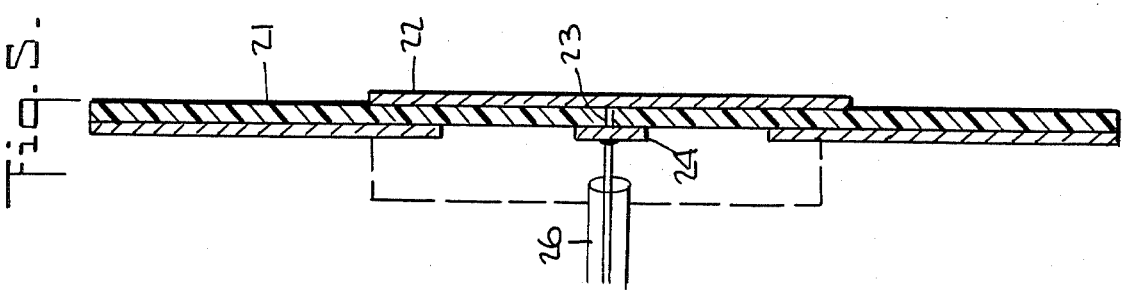
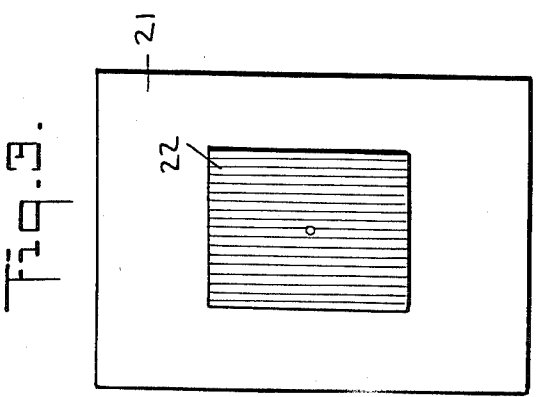
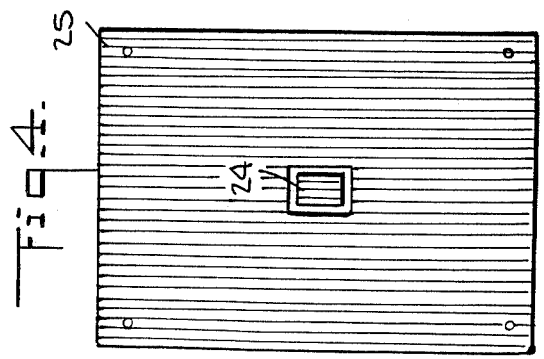

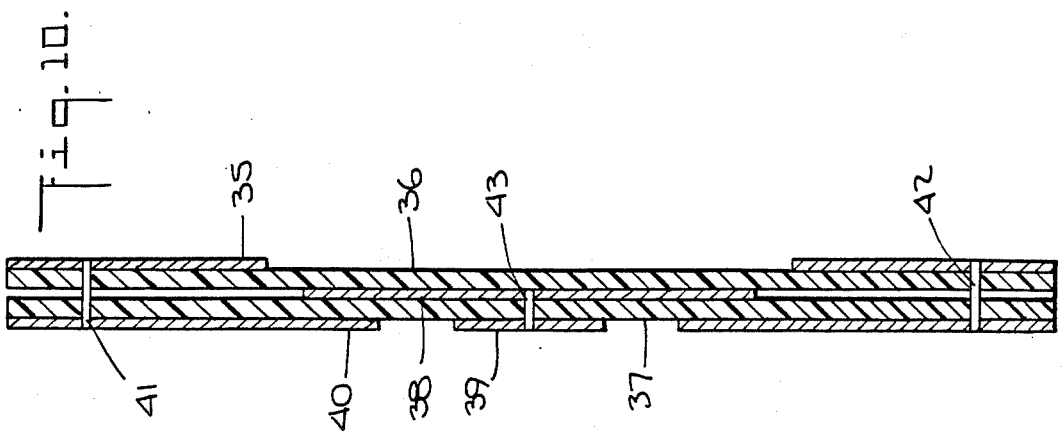
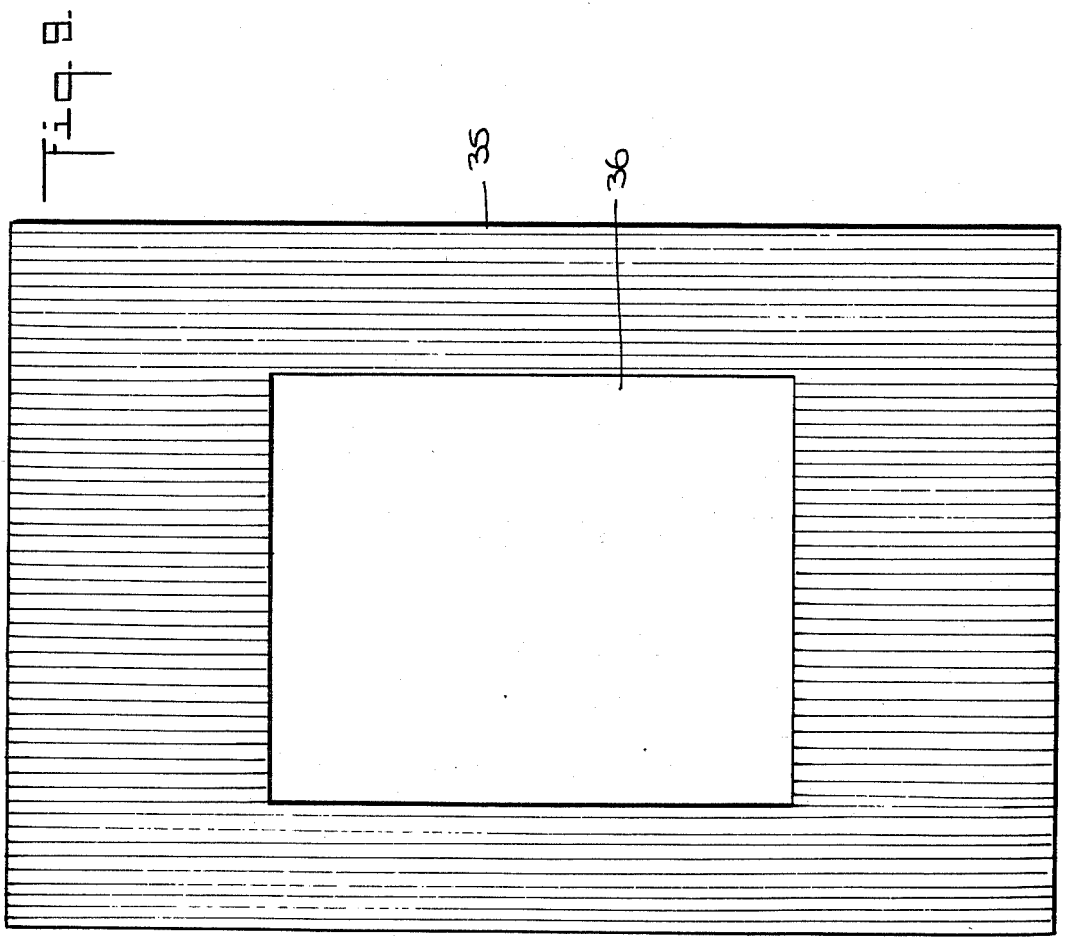

PRINTED CIRCUIT CAPACITANCE ELECTRODES

RELATED APPLICATION

This application is a continuation-in-part of the copending application of Picone et al. Ser. No. 329,302, filed Feb. 14, 1986, entitled "Electromagnetic Flowmeter with Capacitance Type Electrodes," now U.S. Pat. No. 4,658,652. The entire disclosure of this copending case is incorporated herein by reference.

BACKGROUND OF INVENTION

1. Field of Invention

This invention relates generally to electromagnetic flowmeters for measuring the flow rate of fluids, and more particularly to a meter of this type which includes a spool of dielectric material through which the fluid to be metered is conducted, the outer surface of the spool having secured thereto a conforming flexible printed circuit board which is so printed as to define capacitance metering electrodes and shields therefor.

2. Status of Prior Art

Electromagnetic flowmeters such as those disclosed in U.S. Pat. Nos. 3,695,104 and 3,824,856 are especially adapted to measure the volumetric flow rates of fluids which present difficult handling problems, such as corrosive acids, sewage and slurries. Because an instrument of this type is free of flow obstructions, it does not tend to plug or foul.

In a magnetic flowmeter, an electromagnetic field is generated whose lines of flux are mutually perpendicular to the longitudinal axis of the flow tube or spool through which the fluid to be metered is conducted and to the transverse axis along which the measuring or metering electrodes are located at diametrically-opposed positions with respect to the spool. The operating principles of this meter are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

In the Appel U.S. Pat. No. 4,019,366 and in the Schmoock U.S. Pat. No. 4,098,118, instead of small area measuring electrodes in direct contact with the fluid being metered, use is made of electrode assemblies encapsulated in insulation material. Each assembly is formed by a measuring electrode having a large area behind which is a driven shielding electrode of even greater area, the measuring electrodes being isolated from the fluid by a layer of insulation. Each measuring electrode forms one plate of a capacitor whose dielectric is the insulation layer and whose other plate is the fluid, the electrodes acting as a capacitance sensor to detect the voltage induced in the fluid.

A capacitance electrode sensor of this type obviates slurry and galvanic noise problems and is not subject to leakage. Also among the advantages of a capacitance sensor over contact electrodes in a magnetic flowmeter are that the conductivity range of the fluid to be metered may extend down to as low as 0.1 $\mu$S/cm or less, and one may use ordinary metals for the electrodes rather than special materials capable of withstanding the adverse effects of corrosive or abrasive fluids in contact with the electrodes.

The Appel et al. U.S. Pat. No. 4,539,853 discloses a magnetic flowmeter which includes a spool formed by a metallizable ceramic through which the fluid to be metered is conducted. The outer surface of the spool is metallized in its central region to define a pair of capacitative metering electrodes at diametrically-opposed positions, an electromagnetic field being established within the spool whereby when the flowing fluid intercepts this fiedd, an emf is induced therein to produce a signal at the metering electrodes which is a function of flow rate. Overlying each metering electrode and projecting from the spool is a ceramic block whose outer surface is metallized to define a shield electrode which covers the metering electrode.

In this Appel et al. arrangement, the ceramic spool is fabricated of aluminum oxide (alumina). This material has a consistent dielectric constant and high resistivity over the broad range of temperatures encountered in flowmeter operations. Alumina also has excellent abrasion and corrosion resistance and thereby can be used with corrosive fluids as well as those which the flow signal must be measured. Each electrode forms one plate of a capacitor whose dielectric is the ceramic on which it is plated and whose other plate is the fluid being metered. Hence the flow signal is measured through a pair of capacitors located in the body of the alumina spool. The smaller the capacitance values of these capacitors, the higher is the resultant electrical impedance.

Since alumina has a dielectric constant of 9, the capacitance of the two electrode capacitors is quite low. The resultant high impedance creates problems in sensing the flow signal induced in the fluid and picked up by the electrodes. As a consequence, it becomes necessary to use relatively complex and expensive pre-amplifier and amplifier stages. And since the amount of noise coming from the pre-amplifiers is a function of their source input impedance, the noise level in this prior arrangement is relatively high and gives rise to difficulties in distinguishing between the flow signal and the noise to provide accurate flow rate readings.

The related copending application Ser. No. 329,302 of Picone et al. discloses a flowmeter which includes a spool formed by a metallizable ceramic whose dielectric constant is at least 25 through which the fluid to be metered is conducted. The outer surface of the spool is metallized in its central region to define a pair of capacitative metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode. Because of the high dielectric constant of the spool, the electrode capacitors have a high capacitance value to present a relatively low source impedance to an associated pre-amplifier, thereby making possible a substantially noise free output signal.

The practical difficulty with producing capacitance electrodes in a manner disclosed in the related Picone et al. application is that it is difficult and costly to metallize the surface of a ceramic material such as titanium dioxide or partially stabilized zirconium oxide having an exceptionally high dielectric constant.

SUMMARY OF INVENTION

In view of the foregoing, the main object of this invention is to provide a capacitance-type electromagnetic flowmeter that retains all of the advantages of a meter of the type disclosed in the related copending application but which does not require metallization of the ceramic spool to form metering electrodes and shields therefor.

More particularly, an object of this invention is to provide capacitively-coupled electrodes which extend under the electromagnets of a magnetic flowmeter to create an enlarged electrode surface that increases the metering electrode-to-fluid capacitance and allows the meter to operate with less noise.

Also an object of this invention is to provide a flowmeter of the above type which is relatively inexpensive to manufacture.

Briefly stated, these objects are attained in a magnetic flowmeter in which a fluid to be metered is conducted through a ceramic spool coaxially supported within a cylindrical casing to define an inner chamber. Mounted within the chamber at opposing positions on a magnet axis perpendicular to the longitudinal flow axis of the spool are a pair of electromagnets to establish an electromagnetic field in the spool whose lines of flux are intercepted by the fluid to induce a voltage therein. Interposed between the electromagnets and the outer surface of the spool and conforming to and secured to this surface are a pair of flexible printed circuit boards which are so printed as to define capacitance metering electrodes at diametrically-opposed positions on the spool on an electrode axis at right angles to the magnet axis and at right angles to the longitudinal flow axis, whereby the voltage induced in the fluid is picked up by these electrodes to produce a signal which depends on the flow rate of the fluid.

BRIEF DESCRIPTION OF DRAWINGS

For a better understanding of the invention as well as other objects and further features thereof, reference is made to the following detailed description to be read in conjunction with the accompanying drawings, wherein:

FIG. 3 is a front view of the first embodiment of a board according to the invention;

FIG. 4 is a rear view of this board;

FIG. 5 is a side view of this board;

FIG. 6 is a front view of a second embodiment of a board according to the invention;

FIG. 7 is a rear view of this board;

FIG. 8 is a side view of this board;

FIG. 9 is a rear view of one of the layers of a laminated board constituting a third embdiment of the invention; and FIG. 10 is a side view of this laminated board.

DESCRIPTION OF INVENTION

Basic Structure

The basic structure of a magnetic flowmeter in accordance with the invention is similar to that disclosed in the Schmoock et al. U.S. Pat. No. 3,839,912, except that in the present invention, use is made of a spool or flow tube of dielectric material having printed circuit boards conforming thereto which define the capacitance metering electrodes and shields therefor. The invention is not, however, limited to such structures and is usable with other magnetic flowmeter structures which lend themselves to capacitive metering electrodes.

Figure 1:
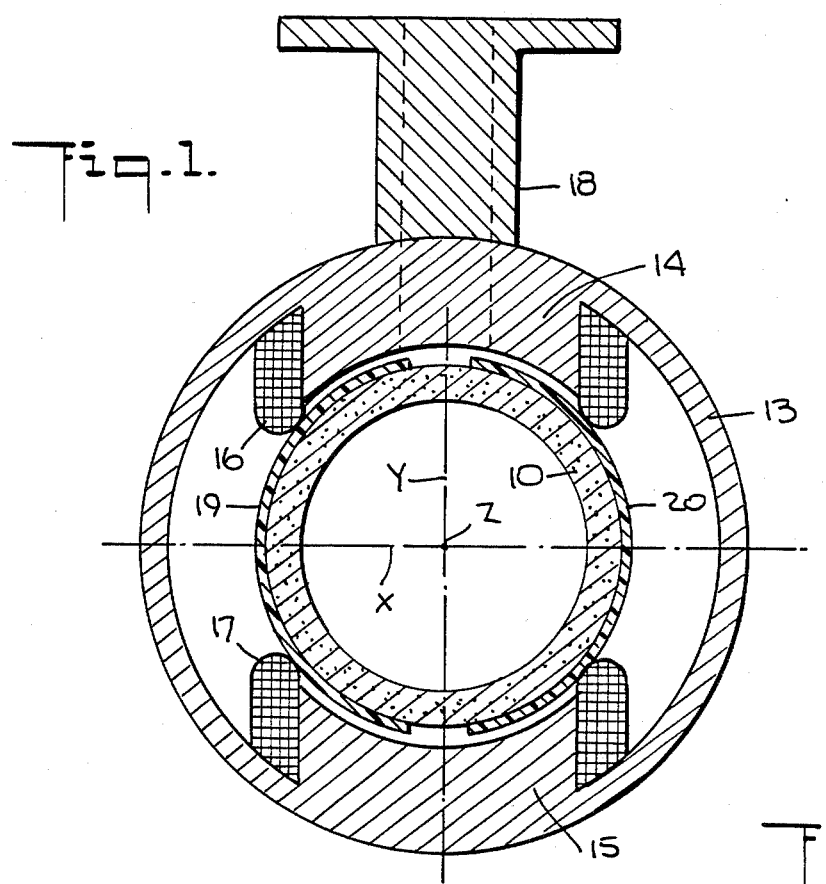
FIG. 1 is a transverse section taken through a magnetic flowmeter which includes a pair of flexible printed circuit boards forming metering electrodes and shields therefor in accordance with the invention.
Figure 2:
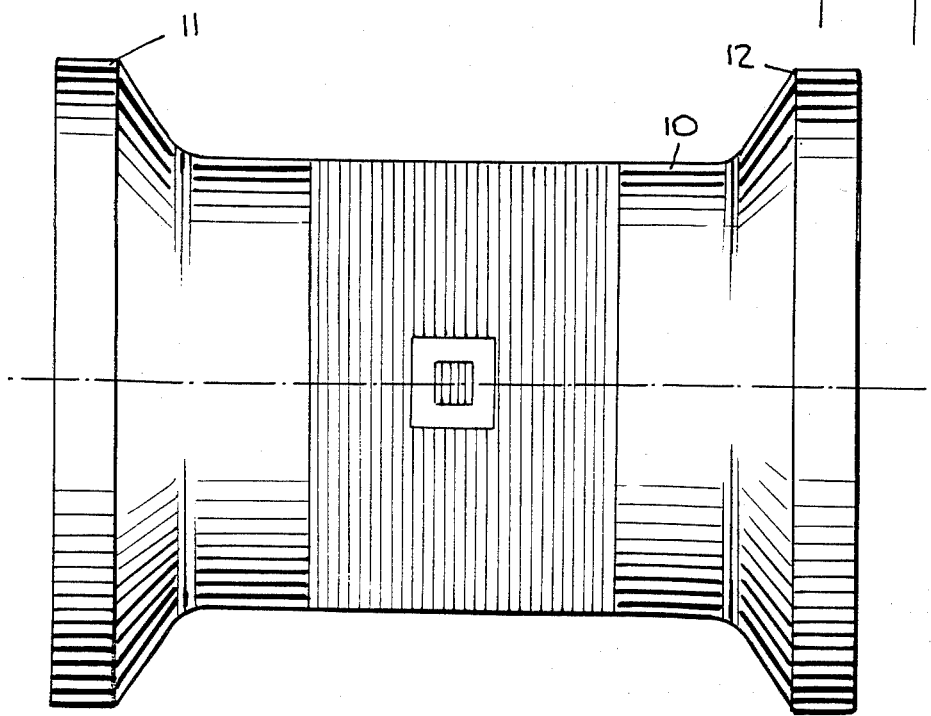
FIG. 2 is an elevational view of the ceramic spool included in the flowmeter and the first embodiment of a printed circuit board mounted on the spool.

Referring now to FIGS. 1 and 2, a magnetic flowmeter according to the invention includes a cylindrical metering spool 10 having end flanges 11 and 12 of enlarged diameter. The spool is formed of ceramic having a high dielectric constant, good electrical insulating properties and sufficient structural strength for its intended purpose.

The dielectric constant of a ceramic material is determined by the ratio of the capacitance of a capacitor using this material as its dielectric to that of the same capacitor having only a vacuum as its dielectric. The dielectric constant of alumina is 9. As previously explained, when alumina is used to form a ceramic metering spool in the manner disclosed in the above-identified copending Appel et al. patent, the resultant electrode capacitance gives rise to a high impedance and its attendant difficulties.

While the present invention is operable with an alumina spool, use is preferably made of a ceramic whose structural properties satisfy the requirements of the meter and whose dielectric constant is at least 25 and is therefore much higher than that of alumina. As a consequence, the electrode impedance is much lower.

A preferred ceramic material is titanium dioxide ($T_iO_2$) or titania, whose dielectric constant lies in the range of 140 to 160 and therefore provides, in the context of the present invention, electrode capacitors having a much higher capacitance value than that produced when using alumina for the ceramic spool.

Also usable as a ceramic for the spool is partially stabilized zirconium oxide or zirconia ($Z_rO_3$). In its unstabilized form, this material is usefuliin the production of piezoelectric crystals and ceramic glazes, and when stabilized with $C_aO$, it is usable as a refractory furnace lining. In its partially stabilized form (PSZ), zirconia has a dielectric constant of about 25.

Surrounding the flanged flow tube 10 and concentric therewith is a cylindrical casing 13 fabricated of cast carbon steel or other "soft" ferromagnetic material. Integral with casing 13 are short magnetic cores 14 and 15 formed of the same cast steel material. These cores are at diametrically-opposed positions along a magnet axis Y normal to the longitudinal flow axis Z of the flow tube which is also the axis of the casing. Magnet axis Y is at right angles to an electrode axis X. Hence the axes of the meter are mutually perpendicular to each other. The core faces have an arcuate formation which follows the curvature of the casing and that of the flow tube which is coaxially disposed therein.

Received over cores 14 and 15 are saddle-shaped coils 16 and 17. These coils are pre-formed and preferably lead shielded so that they can be slipped over the cores to form the electromagnets. The casing functions as a magnetic return path for the electromagnets. When excited by an ac or periodically interrupted dc voltage, the electromagnets establish an electromagnetic field whose lines of flux are substantially at right angles to the direction of fluid flow along flow axis Z. When the fluid passing through flow tube 10 intercepts the field, a voltage is induced therein which is picked up by the metering electrodes to generate a signal that is a function of the flow rate.

Welded to casing 13 is a bracket 18 which serves to support a converter box (not shown) housing the drive circuit for exciting the electromagnets, circuits for driving the shields, and circuits for conditioning the signal derived from the metering electrodes, and all other electronic circuits normally associated with a magnetic flowmeter primary to provide an output signal suitable for transmission to a remote station, for indicating and recording the metered flow rate and for carrying out other process control functions.

The opposite ends of casing 10 are provided with closures whose inner peripheries mate with the end flanges 11 and 12 of flow tube 10 to define an enclosed inner chamber in the space between spool 10 and casing 13. All parts of the meter disposed within the inner chamber defined by the spool and casing are symmetrically disposed with respect to the X-Y-Z axes.

Interposed between the electromagnets and the outer surface of spool 10 are a pair of flexible printed circuit boards 19 and 20, the boards conforming to the outer spool surface and being secured thereto. In practice, the boards may be cemented in place or taped to the spool only around their edges. Coaxial cables are used to connect each electrode and the shields associated therewith to their respective operating circuits, these cables passing through bores in bracket 18 into the converter box mounted therein.

Since there are various embodiments of the printed circuit boards, in FIG. 1 these boards are represented schematically by a pair of blank arcs, while in FIG. 2, the form shown is that of the first embodiment to be now described.

First Embodiment

Referring now to FIGS. 3, 4 and 5 showing a first embodiment of a flexible printed circuit board, this board is formed by a flexible sheet 21 of Teflon (PTFE), polyamide or any other plastic material having good dielectric properties on whose front face is printed a rectangular electrode 22. Electrode 22 is connected by a lead 23 running through sheet 21 to a contact pad 24 printed on the rear surface of sheet 21. Printed on the rear srface of sheet 21 is an outer conductive shield 25. A free space is provided on sheet 21 between shield 25 and contact pad 24 so that the pad is insulated from the shield.

The printed circuit board is made by the same technique commonly used in making printed wiring. In this technique, a copper clad dielectric sheet has conductors etched on either one or both sides thereof. A two-sided board uses plated-through holes to provide electrical continuity between the conductors on opposing sides of the sheet or board. Also known is flexible printed wiring which makes use of thin, flexible dielectric sheets. Several layers of etched conductors may be laminated together and interconnected to form a multi-layer board.

In FIGS. 3 to 10, the thickness of the copper electrodes and shields etched on the flexible dielectric sheet is grossly exaggerated to render these elements more visible. It is to be understood, however, that in practice the copper cladding is extremely thin and has a thickness in the mil range.

Thus, the flexible board shown in FIGS. 3 to 4 has a large metering electrode 22 on its front face, behind which is larger outer shield 25. When this board is secured to the outer surface of flow tube 10, electrode 23 engages this surface and it effectively behaves in the same manner as the metallized electrode in the ceramic flow tube disclosed in the above-identified related patent application. Because this capacitively-coupled electrode is under the coil and pole piece, it is possible to provide a large electrode surface to increase the electrode-to-fluid capacitance and gain the advantages in regard to reduced noise and other factors which are set forth in the related patent application.

Connections from electrode 22 and outer shield 25 to the circuits associated therewith are preferably made by a coaxial cable 26, as shown in FIG. 5, whose inner conductor is connected to the electrode pad 24 and whose outer conductor is connected to outer shield 25.

Second Embodiment

As shown in FIGS. 6, 7 and 8, in the second embodiment the dielectric sheet 27 has a rectangular metering electrode 28 printed on its front face, the electrode lying within a frame-shaped printed inner shield 29. On the rear face of sheet 27 there is printed an outer shield 30. At the center of the rear face is a contact pad 31 which is spaced from the outer shield 30 and is connected by a lead 32 passing through the sheet to metering electrode 28 on the front face. The outer shield 30 is connected by leads 33 and 34 to the inner shield 29.

Thus, this single layer board has both an inner and an outer shield printed thereon which are interconnected. A coaxial cable is used, as in the first embodiment, to connect the electrode and the shields to the associated electronic circuits in the box.

Third Embodiment

In this embodiment as shown in FIGS. 9 and 10, a laminated flexible printed circuit board is created by printing a frame shaped inner shield 35 on a dielectric layer 36 and laminating this layer to a second dielectric layer 37 which is printed in a manner similar to the single layer board shown in FIG. 5.

The second layer 37 is provided with a metering electrode 38 which is sandwiched between the two layers and is connected by a feed through 43 to a contact pad 39 printed on the outer side of layer 37. Also printed on the outer side of layer 37 is a frame shaped outer shield 40 that is connected by feed throughs 41 and 42 to inner shield 35.

This laminated board is electrically equivalent to the single layer board shown in FIG. 8. Connections to the electrode and shields are made by way of a coaxial cable.

While there have been shown and described preferred embodiments of printed circuit capacitance electrodes in accordance with the invention, it will be appreciated that many changes and modifications may be made therein without, however, departing from the essential spirit thereof.

I claim:
1. A magnetic flowmeter comprising:
   A a cylindrical spool of dielectric material functioning as a flow tube for the fluid to be metered coaxi- ally supported within a cylindrical casing to define an inner chamber;

B a pair of electromagnets mounted within the inner chamber at opposing positions therein on a magnet axis perpendicular to the longitudinal flow axis of the spool to establish an electromagnetic field therein whose lines of flux are intercepted by fluid flowing therethrough to induce a voltage in the fluid; and C a pair of flexible printed circuit boards conforming to and secured to the outer surface of the spool and symmetrically disposed on either side of said magnet axis, said boards being so printed as to define capacitance metering electrodes having enlarged surfaces which extend under the electromagnets at diametrically-opposed positions on the spool on an electrode axis at right angles to the magnet axis and at right angles to the longitudinal flow axis whereby the voltage induced in the fluid is picked up by the electrodes to produce a signal which depends on the flow rate of the fluid, each electrode forming one plate of a capacitor whose dielectric is the spool and whose other plate is the fluid.

2. A magnetic flowmeter as set forth in claim 1, wherein said casing is of soft ferromagnetic material and said electromagnets have cores integral with the casing.

3. A magnet as set forth in claim 2, wherein saddle-shaped coils are mounted on said cores.

4. A magnetic flowmeter as set forth in claim 1, wherein said spool is formed of ceramic material having a high dielectric constant.

5. A magnetic flowmeter as set forth in claim 4, wherein said dielectric constant is at least 25.

6. A magnetic flowmeter as set forth in claim 1, wherein each printed circuit board is formed by a sheet of dielectric material having said electrode printed on its front face and in contact with the outer surface of the spool, said electrode being connected by a lead going through said sheet to a contact pad on the rear face of the sheet.

7. A magnetic flowmeter as set forth in claim 6, wherein said rear face has printed thereon an outer shield which surrounds said contact pad.

8. A magnetic flowmeter as set forth in claim 7, wherein said front face has printed thereon a frame-shaped inner shield which surrounds said electrode and is connected by a lead going through the sheet to the outer shield.

9. A magnetic flowmeter as set forth in claim 8, further including a coaxial cable whose inner conductor is connected to said contact pad and whose outer conductor is connected to said outer shield.

10. A magnetic flowmeter as set forth in claim 6, wherein said sheet is formed of PTFE.

11. A magnetic flowmeter as set forth in claim 1, wherein said printed circuit board is composed of a first layer having said electrode printed on one face of a dielectric sheet and having an outer shield printed on the opposite face thereof, said first layer being laminated to a second layer having an inner shield printed on one face thereof so as to effectively surround the electrode when the layers are laminated together.

* * * * *